No. 613,024. Patented Oct. 25, 1898.
M. S. BYRNE, Jr.
FAUCET.
(Application filed Nov. 13, 1897.)
(No Model.)
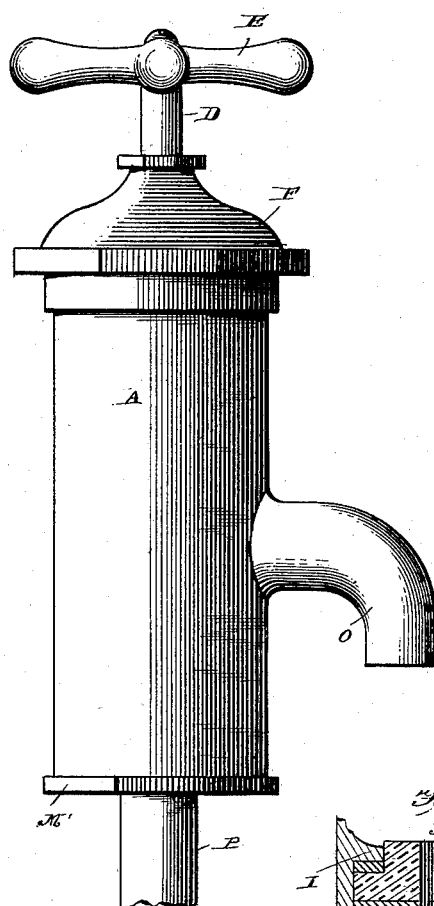
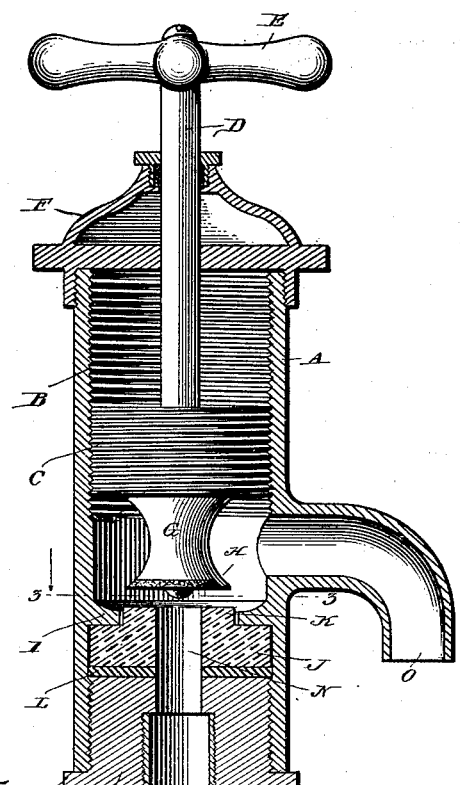
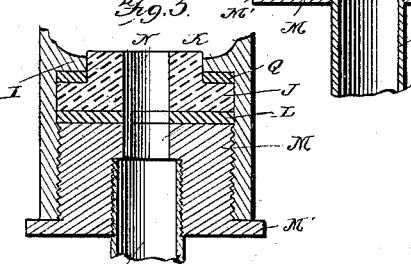
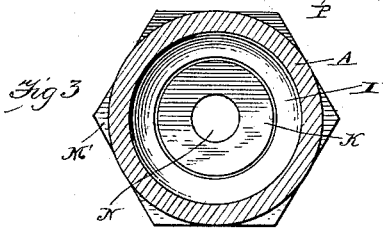
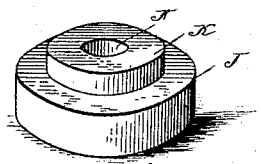
Witnesses
Inventor
Morgan S Byrne Jr.
Attorneys

UNITED STATES PATENT OFFICE.

MORGAN S. BYRNE, JR., OF STAUNTON, VIRGINIA.

FAUCET.

SPECIFICATION forming part of Letters Patent No. 613,024, dated October 25, 1898.

Application filed November 13, 1897. Serial No. 658,432. (No model.)

*To all whom it may concern:*

Be it known that I, MORGAN S. BYRNE, Jr., a citizen of the United States, residing at Staunton, in the county of Augusta and State of Virginia, have invented a new and useful Cock or Faucet, of which the following is a specification.

My invention relates to cocks and faucets, and more especially to that class of cocks and faucets which close by compression.

The general object of my invention is to so improve the construction of this class of cocks and faucets as to render them non-corrosive, and consequently more lasting and more easily kept clean.

With this object in view my invention consists in a cock or faucet provided with a cylindrical body, in which is threaded a valve-head provided with an elastic washer and below the valve-head an inward-projecting annular flange, a valve-seat composed of glass, porcelain, or other analogous material, consisting of a main body of a size to fill the cylinder or body of the valve, and an upward-projecting boss to fit the central opening of the annular flange of the body, an elastic washer fitted in the body of the cock or faucet and bearing against the under face of the valve-seat, and a screw-plug adapted to be threaded into the lower end of the body of the cock or faucet to compress the elastic washer against the under side of the valve-seat, the valve-seat, elastic washer, and screw-plug being centrally perforated.

In order to enable others skilled in the art to which my invention most nearly appertains to make and use the same, I will now proceed to describe its construction and operation, reference being had to the accompanying drawings, forming part of this specification, in which—

Figure 1 is a view in side elevation of a cock or faucet constructed in accordance with my invention. Fig. 2 is a central vertical sectional view of the same. Fig. 3 is a transverse sectional view of the same, taken on the line 3 3 of Fig. 2, looking downward. Fig. 4 is a detail perspective view of the valve-seat. Fig. 5 is a fragmentary detail view, being part of a vertical section on the same plane as Fig. 2, showing a slight modification.

Like letters of reference mark the same parts wherever they occur in the different figures of the drawings.

Referring to the drawings by letters, A is the body or casing of the valve, which is cylindrical in form and interiorly threaded at B to receive the screw-plug C of the valve, to which are attached the usual stem D and handle E, the stem passing upward through the cap F and stuffing-box, said cap being threaded upon the outer upper end of the body A in a well-known manner.

Depending from and forming part of the screw-plug C is the valve-head G, provided on its lower end with an elastic washer H.

I indicates an annular flange formed as part of the casing or body A.

J is the valve-seat, which is provided with an upward-projecting boss K, which fits in the central opening of the flange I, while the main body of the valve-seat is of a proper size and shape to snugly fit the main body or casing below the flange I.

Beneath the valve-seat is an elastic packing-washer L, and below it a screw-plug M is threaded into the lower end of the body A of the casing. The valve-seat J, elastic washer L, and screw-plug M are all centrally perforated, forming a channel N for the passage of the water or liquid into the main body, from which it is delivered by a spout O, the central perforation or bore of the screw-plug M being slightly enlarged and threaded to receive the end of the supply-pipe P.

The construction of my improved cock or faucet will be readily understood from the foregoing description, and its operation may be described as follows: The parts of the valve being in the position shown in Fig. 2, water or other liquid will be admitted through the pipe P and channel N into the main body of the valve, and thence delivered through the spout or nozzle O. When it is desired to stop the flow of water or liquid through the valve, the valve-head is turned downward or inward until its elastic washer H is seated upon the top of the boss K of the valve-seat J, which will hermetically seal the opening in a manner well known. To fit the parts of the valve together, the screw-plug C is threaded into the main body, the cap F passed over the stem and threaded upon the top of the main body, the stuffing-box properly adjusted, and the handle E secured upon the top of the stem. The valve-seat J is then placed in the body A, with its boss K projecting upward through and slightly above the annular flange I, the elastic washer then inserted in position, and finally the screw-plug M, whose outer projecting flange M' is formed angular to receive a wrench, is turned until all the parts fit solidly in position.

The elastic washer L serves the double purpose of a cushion for the rigid valve-seat and as a packing to prevent leaks. If desired, an elastic washer Q (see Fig. 5) may be inserted between the lower face of the annular flange I and the upper face of the main body of the valve J.

From the foregoing description of the construction and operation of my invention it will be obvious that I have produced a compression cock or faucet provided with a valve-seat (and proper mechanism to coöperate therewith) which will be lasting and not affected by corrosive liquids which may be passed through it, the construction of the valve being such that all liability to breakage of the valve-seat on account of its rigidity and brittleness is avoided, although the valve-seat will usually be thoroughly annealed and its brittleness thereby reduced to a minimum.

Having thus fully described my invention, what I claim as new, and desire to secure by Letters Patent of the United States, is—

In combination with the main body of a cock or faucet provided with a screw-impelled valve-head, having an elastic washer on the lower end thereof, of an annular flange formed within the body below the valve-head, a valve-seat provided with a main body to fit the body of the cock or faucet and a boss to fit the opening in the annular flange, an elastic washer resting between the main body of the valve-seat and the lower side of the annular flange, an elastic washer fitted in the main body of the cock or faucet below the valve-seat, and a screw-plug threaded into the main body below the elastic washer, the screw-plug, elastic washer and valve-seat being centrally perforated to provide an inlet-passage, substantially as described.

MORGAN S. BYRNE, JR.

Witnesses:
NEWTON ARGENBRIGHT,
THOS. A. DAWSON.